No. 858,687. PATENTED JULY 2, 1907.
R. VARLEY.
IGNITION SYSTEM FOR EXPLOSION ENGINES.
APPLICATION FILED MAY 31, 1906.

Witnesses
Inventor
Richard Varley.
By his Attorneys

UNITED STATES PATENT OFFICE.

RICHARD VARLEY, OF ENGLEWOOD, NEW JERSEY, ASSIGNOR TO THE AUTOCOIL COMPANY, A CORPORATION OF NEW JERSEY.

IGNITION SYSTEM FOR EXPLOSION-ENGINES.

No. 858,687. Specification of Letters Patent. Patented July 2, 1907.

Application filed May 31, 1906. Serial No. 319,574.

*To all whom it may concern:*

Be it known that I, RICHARD VARLEY, a citizen of the United States, residing at Englewood, in the county of Bergen and State of New Jersey, have invented certain new and useful Improvements in Ignition Systems for Explosion-Engines, of which the following is a full, clear, and exact description.

This invention relates to ignition for explosion engines and has special reference to the systems employing a dynamo driven by the engine itself, as the source of current for the ignition spark.

An explosion engine used for driving an automobile or similar machine is subject to wide variations of speed and it is undesirable for various reasons to drive the ignition dynamo at a corresponding speed to that of the engine at all times. The dynamo can be driven at any speed between a prescribed minimum and maximum rate direct from the engine, but when the speed of the engine increases so that the speed of the dynamo would become abnormally high, it is desirable that the transmission gearing between the engine and dynamo should slip so that the speed of the latter shall not rise above the predetermined maximum. It is found in the practical application of such a transmission system that the clutch or brake mechanism that is employed in the direct line of transmission is liable to become deranged, due to the fact that the entire power is transmitted through it, which being exerted upon the brake strap, shoes or other devices employed, may cause the rubbing surfaces to burn and stick. Or, by reason of some imperfection in the mechanism, or interference by foreign matter, the clutch or brake may fail to yield at a predetermined speed, in any of which cases the dynamo would be driven at an abnormal speed which would be likely to burn out its coils and make expensive repairs necessary. To avoid this occurrence my invention contemplates the provision of a governor which shall be located in or driven by the same transmission train, which shall serve as a safety device to in some manner, electrically or mechanically, disconnect the dynamo in case the clutch or shipping device fails to perform its work when the speed goes beyond the maximum point. When this governor acts, the dynamo ceases to generate; consequently the engine must stop as the electric spark is no longer furnished. This requires the operator to put the slipping device in order at once or else confine the speed of his engine to a point where the predetermined speed of the dynamo will not be exceeded.

Figure 1:
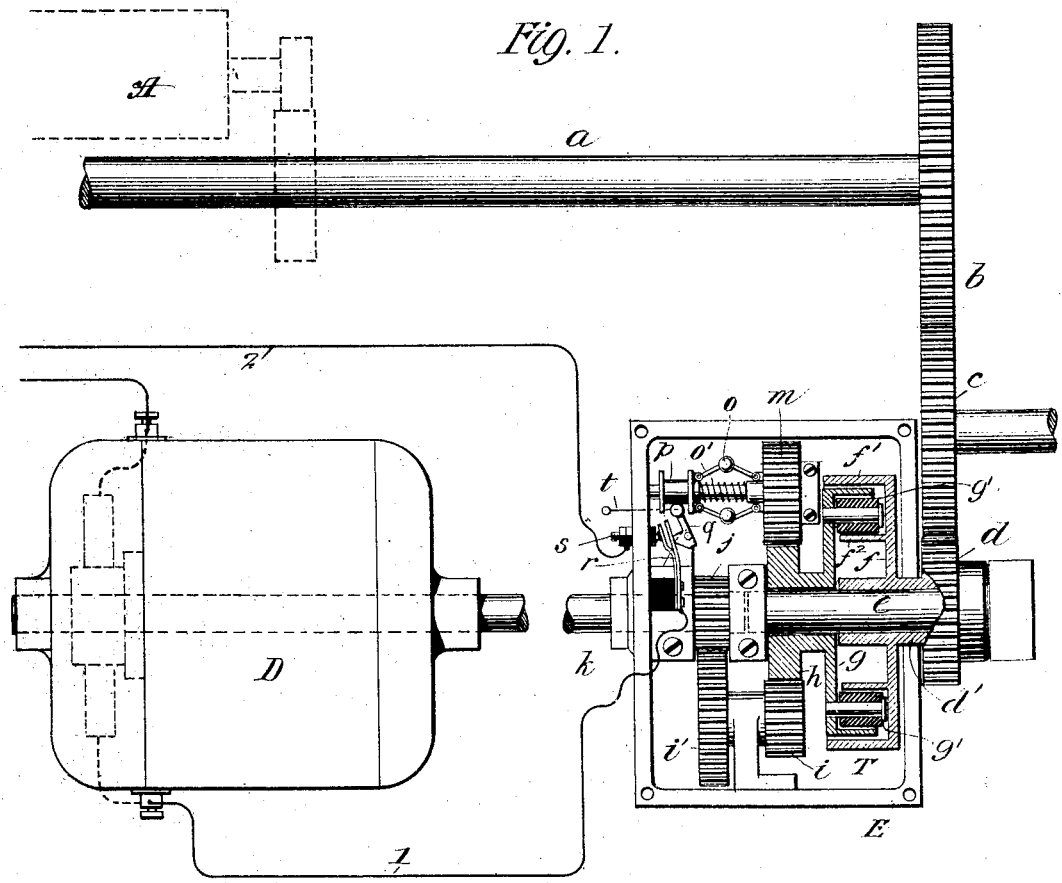
Figure 2:
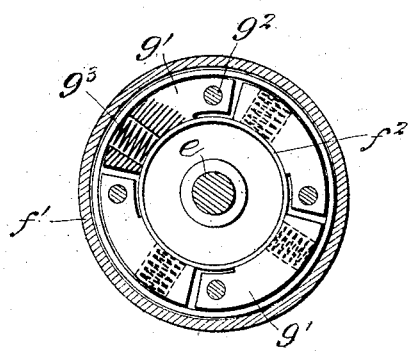

The invention will be described with reference to the accompanying drawing, in which Figure 1 is a plan, partly in section, of the transmission mechanism, including the special features of the invention and showing the engine and dynamo conventionally, and Fig. 2 is a section transverse to the shaft of the slipping mechanism.

The explosion engine is shown conventionally by the dotted lines at A. It drives, through a suitable gearing, $a$ shown as the half-time or cam shaft of the system. This shaft carries a gear wheel $b$ meshing with an idler $c$ which in turn drives a pinion $d$. The relative speeds of $b$ and $d$ being, for instance, as one to two. Pinion $d$ is tight on a sleeve $d'$ having its bearing upon a stationary shaft $e$ mounted in a gear box E. Inside of the box this sleeve carries part of a clutch or flexible power transmitter T, comprising a disk $f$ having a rim $f'$ and an internal drum $f^2$; and also comprising a second disk $g$ carrying a series of shoes $g'$ which are pivoted thereto by the studs and bear upon the outer surface of the drum $f^2$ with pressure determined by springs $g^3$ shown in dotted lines in Fig. 2. Power is thus transmitted from disk $f$ to disk $g$ by reason of the frictional contact between the drum $f^2$ and the shoes $g'$. Disk $g$ is connected with a sleeve loose upon the shaft $e$ and upon which is formed a gear $h$ which drives a pinion $i$ of a separate shaft also carrying a gear $i'$. The latter is in mesh with a pinion $j$ fixed upon a shaft $k$ mounted in line with the shaft $e$ but adapted to rotate. Shaft $k$ extends out of the gear casing and forms the armature shaft of a dynamo D whose circuit is represented by the wires 1, 2, over which the current leads to supply the ignition spark or sparks to the engine A. It will thus be seen that the power of the engine is transmitted through shaft $a$, gears $b$, $c$ and $d$, clutch members $f$ and $g$, gears $h$, $i$, $i'$ and $j$ and shaft $k$ to the dynamo. In addition to this train there is also provided a gear $m$ on a counter-shaft carrying an ordinary ball governor $o$, the centrifugal action of which is opposed by a spring $o'$. Mounted adjacent to the movable sleeve $p$ of the governor is a pivoted lever $q$ having an arm extending into the path of movement of said sleeve, and a toe arranged to act upon the spring contact arm $r$. This contact arm normally rests against the contact $s$ to maintain the circuit of the dynamo closed, since the wire 1 of the dynamo leads to the arm $r$ and the wire 2 to the contact $s$.

The operation is as follows: Let us assume that the transmitter T is adjusted to transmit the power of the engine to the dynamo, without slipping, up to 400 revolutions per minute and that the dynamo shaft at this speed runs at 1600 revolutions per minute which is its highest speed within safety. When the speed of the engine increases so that the transmitter will tend to run at a higher rate than 400 revolutions per minute, the centrifugal force acting upon the shoes of the transmitter will relieve the pressure upon the drum $f^2$ and permit the disk $g$ of the transmitter to drop back or remain at its speed of 400 revolutions, while the disk $f$ will run ahead at any speed which the engine may reach. As long as the transmitter performs this function properly, the sleeve $p$ of the governor will not actuate the lever $q$ and the circuit of the dynamo will remain closed. But if for any reason the transmitter should fail in its function in a manner to cause the disk $g$ to run beyond its predetermined speed of 400, then the centrifugal force acting upon the governor $o$ will move the sleeve $p$ sufficiently to drop lever $q$ and allow the spring contact arm $r$ to fly away from the contact point $s$ and open the dynamo circuit. The construction of this lever $q$ is such that when the direction of force applied to it by the arm $r$ is out of line with its pivotal point, the lever will jump across the center and remain in the open position until restored, so that the circuit cannot be again closed while the engine is slowing down. The operator can now start his engine by manually restoring the lever $q$, which he can do by pulling upon the ball and chain indicated at $t$, but he cannot run his engine at any higher speed than would drive the transmitter at 400 revolutions per minute, for at that point the governor would again come into action and open the circuit, so that if the operator would restore his machine to normal condition, he will make the necessary repair in the transmitter to again place it in working order.

It should be understood that the invention contemplates any device for disconnecting the dynamo so long as it is actuated by a governor, for it will be seen that the trigger lever $q$ or its equivalent might be made to actuate a mechanical clutch on the armature shaft and the same result accomplished.

Having described my invention. I claim:—

In an ignition system, an engine, a dynamo, positively geared connections between said engine and said dynamo said connections including a friction device, centrifugal means for causing said device to slip when a predetermined speed of the engine is exceeded, a governor positively geared to rotate with the dynamo, and means for interrupting the circuit of the dynamo when said governor attains a certain speed of rotation.

In witness whereof. I subscribe my signature, in the presence of two witnesses.

RICHARD VARLEY.

Witnesses:
WM. M. STOCKBRIDGE,
FRANK S. OBER.